United States Patent
Hirayama et al.

[11] Patent Number: 5,811,475
[45] Date of Patent: Sep. 22, 1998

[54] METHOD FOR PRODUCING CARBONACEOUS MATERIAL

[75] Inventors: Takayuki Hirayama, Kawasaki; Yoshifumi Morita, Muroran; Haruyoshi Sato, Kawasaki; Yutaka Otsuki, Yokohama, all of Japan

[73] Assignee: Nippon Oil Co., Ltd., Tokyo, Japan

[21] Appl. No.: 669,586

[22] Filed: Jun. 24, 1996

[30] Foreign Application Priority Data

Jun. 28, 1995 [JP] Japan .................................. 7-162303

[51] Int. Cl.⁶ .................................................. C08F 292/00
[52] U.S. Cl. .......................... 523/215; 523/204; 523/403; 423/449.2; 423/449.6
[58] Field of Search ..................................... 523/215, 204, 523/403; 423/449.2, 449.6

[56] References Cited

U.S. PATENT DOCUMENTS 4,940,749  7/1990  Mori et al. ............................... 523/215

FOREIGN PATENT DOCUMENTS 63-158566  7/1988  Japan .
 1079279   3/1989  Japan .

*Primary Examiner*—Vasu Jagannathan
*Assistant Examiner*—Olga Asinovsky
*Attorney, Agent, or Firm*—Darby & Darby

[57] ABSTRACT

A method for producing a carbonaceous material including the step of contacting a carbon material with a polymer having in the molecule thereof one or more reactive group(s) selected from aziridine group, oxazoline group, N-hydroxyalkylamido group, epoxy group, thioepoxy group, isocyanato group, hydroxyl group, amino group, vinyl group, acryl group or methacryl group, and an alkoxycarbonyl group represented by the formula (I)

$$R^1R^2R^3C-O-CO- \qquad (I)$$

wherein $R^1$, $R^2$ and $R^3$ are the same or different groups and denote a hydrogen atom, or a specific organic residue.

23 Claims, No Drawings

METHOD FOR PRODUCING CARBONACEOUS MATERIAL

BACKGROUND OF THE INVENTION

This invention relates to a method for producing a carbonaceous material which can be used as a raw material for an aqueous ink or electrical insulating film having extremely low electrical conductivity.

A carbon material is generally known as an electrically conductive material. There are known methods of modifying the surface of a carbon material by grafting various polymers on the surface of the material, or by coupling various kinds of inorganic materials. However, none of the above methods can sufficiently increase electrical resistance.

As a method for increasing the electrical resistance of a carbonaceous material made from a carbon material, strategies such as increasing the polarity of a binder material used in the carbonaceous material, or minimizing the content of the carbon material, are generally adopted. However, high electrical resistance has not yet been achieved in a carbonaceous material with high content of the carbon material.

SUMMARY OF THE INVENTION

The object of the present invention is to provide a method for producing a carbonaceous material having extremely high electrical resistance.

The above and other objects of the invention will become apparent from the following description.

According to the present invention, there is provided a method for producing a carbonaceous material comprising the step of contacting a carbon material (a) with a polymer (b) having in the molecule thereof one or more reactive group(s) selected from the group consisting of aziridine group, oxazoline group, N-hydroxyalkylamido group, epoxy group, thioepoxy group, isocyanato group, hydroxyl group, amino group, vinyl group, acryl group and methacryl group, and an alkoxycarbonyl group represented by the formula (I)

$$R^1R^2R^3C\text{—}O\text{—}CO\text{—} \quad (I)$$

wherein $R^1$, $R^2$ and $R^3$ are the same or different groups and denote a hydrogen atom, or an organic residue selected from an alkyl group having 1 to 6 carbon atom(s), a cycloalkyl group having 5 to 8 carbon atoms, an alkylcycloalkyl group having 6 to 16 carbon atoms or an aryl group having 6 to 16 carbon atoms, where at least two of $R^1$, $R^2$ and $R^3$ denote the organic residue which may be bonded cyclically with each other.

PREFERRED EMBODIMENTS OF THE INVENTION

The present invention will be explained in more detail hereinbelow.

In the production method of the present invention, the step of contacting a carbon material (a) with a polymer (b) having a specific reactive group and a specific alkoxycarbonyl group in the molecule thereof is performed.

There is no limitation to the carbon material (a) employed in the present invention, but it is preferable to employ a carbon material having on its surface at least one functional group selected from the group consisting of quinone group, carboxyl group, urethane group and hydroxyl group. Specifically, the preferable carbon material may include carbon black, aniline black, phenylene black, titan black, graphite, carbon fiber, and carbon whisker. Among these, carbon black is the most preferable because of its coloring ability and readiness of contacting reaction to be described later.

If the carbon black is employed as the carbon material (a), the preferable average particle size of the carbon black is not more than 1 μm, more preferably 0.01 to 0.5 μm, and most preferably 0.01 to 0.3 μm. Also, it is preferable that the carbon black has a pH value of not more than 7, more preferably 1 to 4, measured in the form of an aqueous solution by a method according to ISO-787-9, in terms of its readiness of the contacting reaction with the polymer (b). Examples of the carbon black may include furnace black, channel black, acetylene black and lamp black. Among these, channel black is the most preferable in terms of its average particle size and pH value.

The specific reactive group which the polymer (b) of the present invention has in the molecule thereof as the requisite group is one or more reactive group(s) selected from the group consisting of aziridine group, oxazoline group, N-hydroxyalkylamido group, epoxy group, thioepoxy group, isocyanato group, amino group, hydroxyl group, vinyl group, acryl group and methacryl group. Among these, the specific reactive group is preferably aziridine group, oxazoline group, N-hydroxyalkylamido group, epoxy group, isocyanato group and hydroxyl group, and more preferably aziridine group, oxazoline group, N-hydroxyalkylamido group, epoxy group and hydroxyl group, in terms of its reactivity with the functional group on the surface of the carbon material (a).

Particularly, if hydroxyl group coexists with one or more other reactive group(s) in the molecule of the polymer (b), the obtained carbonaceous material may be readily heat-cured by mixing the carbonaceous material with various curing agent. Therefore, the polymer (b) preferably includes hydroxyl group as the requisite reactive group, together with one or more other reactive group(s).

The specific alkoxycarbonyl group which the polymer (b) has as the requisite group is represented by the formula (I). $R^1$, $R^2$ and $R^3$ in the formula (I) are the same or different groups and denote a hydrogen atom, or an organic residue selected from an alkyl group having 1 to 6, preferably 1 to 3 carbon atom(s), a cycloalkyl group having 5 to 8, preferably 5 to 6 carbon atoms, an alkylcycloalkyl group having 6 to 16, preferably 6 to 9 carbon atoms, or an aryl group having 6 to 16, preferably 6 to 10 carbon atoms, provided that at least two of $R^1$, $R^2$ and $R^3$ are the organic residue. The organic residues may be cyclically bonded with each other. If the two of the organic residues in $R^1$, $R^2$ and $R^3$ are bonded cyclically, the two organic residues bonded cyclically are divalent groups.

The alkyl group may include methyl group, ethyl group, propyl group, butyl group, pentyl group and hexyl group, which may be straight or branched, and which may be primary, secondary or tertiary. The cycloalkyl group may include cyclopentyl group, cyclohexyl group, cycloheptyl group, and cyclooctyl group. The alkylcycloalkyl group may include methylcyclopentyl group, methylcyclohexyl group, dimethylcyclohexyl group, and ethylcyclohexyl group. The aryl group may include phenyl group, methylphenyl group, and t-butylphenyl group.

The examples of the alkoxycarbonyl group represented by the formula (I) may include t-butyloxycarbonyl group, 1,1-dimethylpropyloxycarbonyl group, 1-methyl-1-ethylpropyloxycarbonyl group, 1,1- diethylpropyloxycarbonyl group, 1,1-dimethylbutyloxycarbonyl group, 1,1-diethylbutyloxycarbonyl group, 1,1-dipropylbutyloxycarbonyl group, 1-methyl-1-ethylbutyloxycarbonyl group, 1-methyl-1-propylbutyloxycarbonyl group, 1-ethyl-1-propylbutyloxycarbonyl group, 1-phenylethyloxycarbonyl group, 1-methyl-1-phenylethyloxycarbonyl group, 1-phenylpropyloxycarbonyl group, 1-methyl-1-phenylpropyloxycarbonyl group, 1-ethyl-1-phenylpropyloxycarbonyl group, 1-phenylbutyloxycarbonyl group, 1-methy-1-phenylbutyloxycarbonyl group, 1-ethyl-1-phenylbutyloxycarbonyl group, 1-propyl-1-phenylbutyloxycarbonyl group, 1-(4-methylphenyl) ethyloxycarbonyl group, 1-methyl-1-(4-methyl) phenylethyloxycarbonyl group, 1-(4-methylphenyl) propyloxycarbonyl group, 1-methyl-1-(4-methylphenyl) propyloxycarbonyl group, 1-ethyl-1-(4-methylphenyl) propyloxycarbonyl group, 1-(4-methylphenyl) butyloxycarbonyl group, 1-methyl-1-(4-methylphenyl) butyloxycarbonyl group, 1-ethyl-1-(4-methylphenyl) butyloxycarbonyl group, 1-propyl-1-(4-methylphenyl) butyloxycarbonyl group, 1-cyclopentylethyloxycarbonyl group, 1-methyl-1-cyclopentylethyloxycarbonyl group, 1-cyclopentylpropyloxycarbonyl group, 1-methyl-1-cyclopentylpropyloxycarbonyl group, 1-ethyl-1-cyclopentylpropyloxycarbonyl group, 1-cyclopentylbutyloxycarbonyl group, 1-methyl-1-cyclopentylbutyloxycarbonyl group, 1-ethyl-1-cyclopentylbutyloxycarbonyl group, 1-propyl-1-cyclopentylbutyloxycarbonyl group, 1-cyclohexylethyloxycarbonyl group, 1-methyl-1-cyclohexylethyloxycarbonyl group, 1-cyclohexylpropyloxycarbonyl group, 1-methyl-1-cyclohexylpropyloxycarbonyl group, 1-ethyl-1-cyclohexylpropyloxycarbonyl group, 1-cyclohexylbutyloxycarbonyl group, 1-methyl-1-cyclohexylbutyloxycarbonyl group, 1-ethyl-1-cyclohexylbutyloxycarbonyl group, 1-propyl-1-cyclohexylbutyloxycarbonyl group, 1-(4-methylcyclohexyl) ethyloxycarbonyl group, 1-methyl-1-(4-methylcyclohexyl) ethyloxycarbonyl group, 1-(4-methylcyclohexyl) propyloxycarbonyl group, 1-methyl-1-(4-methylcyclohexyl) propyloxycarbonyl group, 1-ethyl-1-(4-methylcyclohexyl) propyloxycarbonyl group, 1-(4-methylcyclohexyl) butyloxycarbonyl group, 1-methyl-1-(4-methylcyclohexyl) butyloxycarbonyl group, 1-ethyl-1-(4-methylcyclohexyl) butyloxycarbonyl group, 1-propyl-1-(4-methylcyclohexyl) butyloxycarbonyl group, 1-(2,4-dimethylcyclohexyl) ethyloxycarbonyl group, 1-methyl-1-(2,4-dimethylcyclohexyl) ethyloxycarbonyl group, 1-(2,4-dimethylcyclohexyl) propyloxycarbonyl group, 1-methyl-1-(2,4-dimethylcyclohexyl)propyloxycarbonyl group, 1-ethyl-1-(2,4-dimethylcyclohexyl)propyloxycarbonyl group, 1-(2,4-dimethylcyclohexyl)butyloxycarbonyl group, 1-methyl-1-(2,4-dimethylcyclohexyl)butyloxycarbonyl group, 1-ethyl-1-(2,4 -dimethylcyclohexyl)butyloxycarbonyl group, 1-propyl-1-(2,4-dimethylcyclohexyl)butyloxycarbonyl group, cyclopentyloxycarbonyl group, 1-methylcyclopentyloxycarbonyl group, 1-ethylcyclopentyloxycarbonyl group, 1-propylcyclopentyloxycarbonyl group, 1-butylcyclopentyloxycarbonyl group, cyclohexyloxycarbonyl group, 1-methylcyclohexyloxycarbonyl group, 1-ethylcyclohexyloxycarbonyl group, 1-propylcyclohexyloxycarbonyl group, 1-butylcyclohexyloxycarbonyl group, 1-pentylcyclohexyloxycarbonyl group, 1-methylcycloheptyloxycarbonyl group and 1-methylcyclooctyloxycarbonyl group.

There is no limitation to the number average molecular weight (employing polystyrene as a standard sample) of the polymer (b) having such reactive groups and alkoxycarbonyl groups, but the preferable number average molecular weight thereof is 1000 to 100000, more preferably 5000 to 30000. Also, there is no limitation to the contents of the aforementioned specific reactive group and the aforementioned specific alkoxycarbonyl group in the molecule of the polymer (b), but the preferable content of the specific reactive group (b) is 1 to 500 mmol per 100 g of the polymer (b), and the preferable content of the specific alkoxycarbonyl group is 1 to 500 mmol per 100 g of the polymer (b).

The polymer (b) which is to be used in the present invention may be prepared by copolymerization of a monomer having the aforementioned specific reactive group with a monomer having the aforementioned specific alkoxycarbonyl group. In order to obtain a polymer having high molecular weight, other monomers which do not contribute to the contacting with the carbon material (a) may be copolymerized simultaneously.

The monomer having the specific reactive group may include, for example, aziridine group-containing polymerizable monomers represented by the formulae such as $CH_2=C(CH_3)-NHCO-A^2-A^1$, $CH_2=CH-COO-CH_2CH_2-A^1$, $CH_2=C(CH_3)-COO-CH_2CH_2-A^1$, $CH_2=CH-COO-CH_2CH_2-A^3$, $CH_2=C(CH_3)-COO-CH_2CH_2-A^3$, $CH_2=CH-COO-CH_2CH_2-A^4$, $CH_2=C(CH_3)-COO-CH_2CH_2-A^4$, $CH_2=CH-COO-CH_2CH_2-A^5$, $CH_2=C(CH_3)-COO-CH_2CH_2-A^5$, $CH_2=CH-A^1$, $CH_2=CH-CH_2-A^1$, $CH_2=CH-A^2-A^1$, $CH_2=C(CH_3)-A^2-A^1$, $CH_2=CH-A^2-CH_2-A^1$, $CH_2=C(CH_3)-A^2-CH_2-A^1$, $CH_2=CH-A^2-CH_2CH_2-A^1$, $CH_2=C(CH_3)-A^2-CH_2CH_2-A^1$, $CH_2=CH-NHCO-A^2-A^1$, $CH_2=CH-COO-CH(CH)_3-CH_2-A^1$, $CH_2=C(CH_3)-COO-CH(CH)_3-CH_2-A^1$, $CH_2=CH-COO-(CH_2CH_2O)n-CH_2CH_2O-A^1$, $CH_2=C(CH_3)-COO-(CH_2CH_2O)n-CH_2CH_2O-A^1$, $CH_2=CH-COO-(CH_2CH_2O)n-CO-CH_2CH_2O-A^1$, $CH_2=C(CH_3)-COO-(CH_2CH_2O)n-CO-CH_2CH_2O-A^1$, $CH(CH_2CH_2O-CO-CH=CH_2)_2-CH_2O-CO-CH_2CH_2-A^1$, $CH(CH_2CH_2O-CO-C(CH_3)=CH_2)_2-CH_2O-CO-CH_2CH_2-A^1$, $CH_3CH_2-C(CH_2O-CO-CH=CH_2)_2-CH_2O-CO-CH_2CH_2-A^1$, $CH_3CH_2-C(CH_2O-CO-C(CH_3)=CH_2)_2-CH_2O-CO-CH_2CH_2-A^1$, $CH_2=CH-CO-A^1$, $CH_2=C(CH_3)-CO-A^1$, $CH_2=CH-OCO-A^1$, $CH_2=C(CH_3)-OCO-A^1$, $CH_2=CH-SO_2-A^1$, $CH_2=C(CH_3)-SO_2-A^1$, $CH_2=CH-NHCO-A^1$, $CH_2=C(CH_3)-NHCO-A^1$, $CH_2=CH-NHCS-A^1$, $CH_2=C(CH_3)-NHCS-A^1$, $CH_2=CH-CH_2-OCO-A^1$, $CH_2=CH-CO-A^3$, $CH_2=C(CH_3)-CO-A^3$, $CH_2=CH-CO-A^4$, $CH_2=C(CH_3)-CO-A^4$, $CH_2=CH-CO-A^5$, $CH_2=C(CH_3)-CO-A^5$, $CH_2=CH-A^2-SO_2-A^1$, $CH_2=C(CH_3)-A^2-SO_2-A^1$, $CH_2=CH-A^2-NHCO-A^1$, $CH_2=C(CH_3)-A^2-NHCO-A^1$, $CH_2=CH-CONH-A^2-SO_2-A^1$, $CH_2=C(CH_3)-CONH-A^2-SO_2-A^1$, $CH_2=CH-COO-CH_2CH_2-NHCO-A^1$, $CH_2=C(CH_3)-COO-CH_2CH_2-NHCO-A^1$ and $(CH_2=CH-CH_2NH)_2-PO-A^1$, wherein $A^1$ denotes aziridine group, $A^2$ denotes 1,4-substituted phenylene group, $A^3$ denotes 2-methylaziridine group, $A^4$ denotes 2,2-dimethylaziridine group, and $A^5$ denotes 2-ethylaziridine group;

oxazoline group-containing polymerizable monomers such as 2-vinyl-2-oxazoline, 2-vinyl-4-methyl-2-oxazoline, 2-vinyl-5-methyl-2-oxazoline, 2-vinyl-4-ethyl-2-oxazoline, 2-vinyl-5-ethyl-2-oxazoline, 2-isopropenyl-2-oxazoline, 2-isopropenyl-4-methyl-2-oxazoline, 2-isopropenyl-5-methyl-2-oxazoline, 2-isopropenyl-4-ethyl-2-oxazoline, 2-isopropenyl-5-ethyl-2-oxazoline and 2-isopropenyl-4,5-dimethyl-2-oxazoline;

N-hydroxyalkylamido group-containing polymerizable monomers such as N-hydroxymethylacrylamide, N-hydroxyethylacrylamide, N-hydroxybutylacrylamide, N-hydroxyisobutylacrylamide, N-hydroxy-2-ethylhexylacrylamide, N-hydroxycyclohexylacrylamide, N-hydroxymethylmethacrylamide, N-hydroxyethylmethacrylamide, N-hydroxybutylmethacrylamide, N-hydroxyisobutylmethacrylamide, N-hydroxy-2-ethylhexylmethacrylamide and N-hydroxycyclohexylmethacrylamide;

epoxy group-containing polymerizable monomers represented by the formulae such as $CH_2=CH-A^6$, $CH_2=CH-A^2-A^6$, $CH_2=CH-A^2-CH_2-A^6$, $CH_2=CH-A^2-CH_2-CH_2-A^6$, $CH_2=C(CH_3)-A^2-A^6$, $CH_2=C(CH_3)-A^2-CH_2-A^6$, $CH_2=C(CH_3)-A^2-CH_2-CH_2-A^6$, $CH_2=CH-NHCO-A^2-A^6$, $CH_2=C(CH_3)-NHCO-A^2-A^6$, $CH_2=CH-A^2-O-(CH(R^4)CHO)n-CH_2-A^6$, $CH_2=C(CH_3)-A^2-O-(CH(R^4)CHO)n-CH_2-A^6$, $CH_2=CH-COO-(CH(R^4)CHO)n-CH_2-A^6$ and $CH_2=C(CH_3)-COO-(CH(R^4)CHO)n-CH_2-A^6$, wherein $R^4$ denotes a hydrogen atom or methyl group, $A^2$ denotes 1,4-substituted phenylene group, $A^6$ denotes epoxy group, and n is an integer of 0 or 1 to 20;

thioepoxy group-containing polymerizable monomers represented by the formulae such as $CH_2=CH-A^7$, $CH_2=CH-A^2-A^7$, $CH_2=CH-A^2-CH_2-A^7$, $CH_2=CH-A^2-CH_2-CH_2-A^7$, $CH_2=C(CH_3)-A^2-A^7$, $CH_2=C(CH_3)-A^2-CH_2-A^7$, $CH_2=C(CH_3)-A^2-CH_2-CH_2-A^7$, $CH_2=CH-NHCO-A^2-A^7$, $CH_2=C(CH_3)-NHCO-A^2-A^7$, $CH_2=CH-A^2-O-(CH(R^4)CHO)n-CH_2-A^7$, $CH_2=C(CH_3)-A^2-O-(CH(R^4)CHO)n-CH_2-A^7$, $CH_2=CH-COO-(CH(R^4)CHO)n-CH_2-A^7$ and $CH_2=C(CH_3)-COO-(CH(R^4)CHO)n-CH_2-A^7$, wherein $R^4$ denotes a hydrogen atom or methyl group, $A^2$ denotes 1,4-substituted phenylene group, $A^7$ denotes thioepoxy group, and n is an integer of 0 or 1 to 20;

isocyanato group-containing polymerizable monomers represented by the formulae such as $CH_2=CH-COO-(CH_2)n-N=C=O$, $CH_2=C(CH_3)-COO-(CH_2)n-N=C=O$, $CH_2=CH-COO-(CH_2)n-OCONH-A^8$, $CH_2=C(CH_3)-COO-(CH_2)n-OCONH-A^8$, $CH_2=CH-COO-(CH_2)n-OCONH-A^9$ and $CH_2=C(CH_3)-COO-(CH_2)n-OCONH-A^9$, wherein $A^8$ and $A^9$ denote the groups represented by the following formulae, respectively,

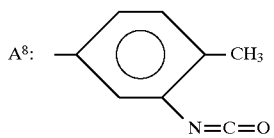

-continued

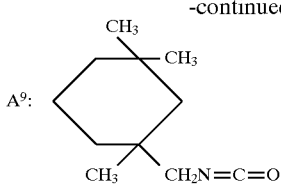

and n is an integer of 0 or 1 to 20;

hydroxyl group-containing polymerizable monomers represented by the formulae such as $CH_2=CH-COO-CH_2CH_2-OH$, $CH_2=C(CH_3)-COO-CH_2CH_2-OH$, $CH_2=CH-COO-CH_2CH(OH)CH_2Cl$, $CH_2=C(CH_3)-COO-CH_2CH(OH)CH_2Cl$, $CH_2=CH-COO-CH(CH_3)CH_2-OH$, $CH_2=C(CH_3)-COO-CH(CH_3)CH_2-OH$, $CH_2=CH-COO-CH_2CH(OH)CH_3$, $CH_2=C(CH_3)-COO-CH_2CH(OH)CH_3$, $CH_2=CH-COO-CH_2CH_2CH_2-OH$, $CH_2=C(CH_3)-COO-CH_2CH_2CH_2-OH$, $CH_2=CH-COO-CH_2CH(OH)CH_2-OH$, $CH_2=C(CH_3)-COO-CH_2CH(OH)CH_2-OH$, $CH_2=CH-COO-CH_2CH(OH)CH_2CH_3$, $CH_2=C(CH_3)-COO-CH_2CH(OH)CH_2CH_3$, $CH_2=CH-COO-CH_2CH_2CH_2CH_2-OH$, $CH_2=C(CH_3)-COO-CH_2CH_2CH_2CH_2-OH$, $CH_2=CH-COO-CH_2CH_2-O-CH_2CH_2-OH$, $CH_2=C(CH_3)-COO-CH_2CH_2-O-CH_2CH_2-OH$, $CH_2=CH-COO-CH_2CH_2-OCO-A^{10}-COO-CH_2CH(OH)CH_3$ and $CH_2=CH-COO-CH_2CH(OH)-CH_2O-A^{11}$, herein $A^{10}$ denotes 1,2-substituted phenylene group, and $A^{11}$ denotes phenyl group; and amino group-containing polymerizable monomers such as 4-vinylaniline and allylamine, all of which may be used alone or as a mixture.

The monomer having the specific alkoxycarbonyl group may include, for example, t-butyl (meth)acrylate, t-pentyl (meth)acrylate, 1-phenylethyl (meth)acrylate, and triethylmethyl (meth)acrylate.

Other monomers mentioned above which do not contribute to the contacting with the carbon material (a) may include, for example, alkyl (meth)acrylates having 1 to 18 carbon atoms such as methyl (meth)acrylate, ethyl (meth) acrylate, butyl (meth)acrylate, isobutyl (meth) acrylate, hexyl (meth)acrylate, lauryl (meth)acrylate, cetyl acrylate, stearyl acrylate, cyclohexyl (meth) acrylate, benzyl (meth) acrylate, isobornyl (meth) acrylate, 2-methoxyethyl (meth) acrylate, 3-methoxybutyl (meth)acrylate, ethylcarbitol (meth)acrylate, phenoxyethyl (meth)acrylate, trifluoroethyl (meth) acrylate, tetrafluoropropyl (meth)acrylate, hexafluoropropyl (meth)acrylate, octafluoropentyl (meth) acrylate, heptadecafluorodecyl (meth)acrylate, trymethylsiloxyethyl (meth)acrylate, tetrahydrofurfuryl (meth)acrylate, phenoxy-polyethylene glycol (meth) acrylate, methoxytripropylene glycol (meth)acrylate and methoxytriethylene glycol (meth) acrylate; N-substituted maleimides such as N-cyclohexylmaleimide, N-phenylmaleimide, N-(2-chlorophenyl)maleimide and N-laurylmaleimide; styrene monomers such as styrene, o-methylstyrene, m-methylstyrene, p-methylstyrene, p-methoxystyrene, p-tert-butylstyrene, p-phenylstyrene, o-chlorostyrene, m-chlorostyrene and p-chlorostyrene; ethylene, propylene, butylene, vinyl chloride, vinyl acetate, acrylonitrile, and N-vinylpyrrolidone.

The polymerization for preparing the polymer (b) may be effected by a conventional method such as solution polymerization, suspension polymerization, emulsion polymerization, precipitation polymerization, and bulk polymerization. Among these, the solution polymerization is usually preferred. When the solution polymerization is employed, organic solvents such as isopropyl alcohol, methyl ethyl ketone, hexane, butyl cellosolve, diethylene glycol dimethyl ether are usually employed as a solvent for the reaction. The conditions such as the temperature and duration for the reaction may be suitably selected in accordance with the material monomers to be employed so that, for example, the number average molecular weight is in the aforementioned preferred range.

In the production method of the present invention, the carbon material (a) and the polymer (b) are contacted. The contacting is preferably performed so that the polymer (b) covalently bonds to at least a surface of the carbon material (a).

The conditions of contacting are not particularly limited because the conditions vary depending on the kind of reactive groups in the polymer (b). The temperature for contacting is usually 30° to 230° C. and preferably 70° to 180° C. For example, when a polymer (b) having epoxy group as a reactive group is employed, the preferable temperature for contacting is 80° to 200° C., particularly 100° to 180° C. When a polymer (b) having oxazoline group as a reactive group is employed, the preferable temperature for contacting is 30° to 200° C., particularly 70° to 180° C. When a polymer (b) having hydroxyl group as a reactive group is employed, the preferable temperature for contacting is 60° to 230° C., particularly 100° to 210° C. Contacting time varies depending on the carbon material (a) to be employed as well as the contacting procedure of the carbon material (a) and the polymer (b), but is preferably 1 minute to 24 hours, particularly 3 minutes to 5 hours.

The weight ratio of the carbon material (a) to the polymer (b) which are contacted is preferably 1:0.5 to 1:10, particularly 1:1 to 1:5. The weight ratio of the carbon material (a) to the polymer (b) which are reacted upon the above contacting is preferably 1:0.5 to 1:10, particularly 1:1 to 1:5.

Upon contacting the carbon material (a) with the polymer (b), the reaction which occurs by contacting may be promoted by applying a catalyst such as acid or alkali. Also, upon contacting, a solvent which does not affect the reaction, such as isopropyl alcohol, methyl ethyl ketone, and hexane, may be employed.

The contacting is usually performed by agitative mixing. In order to improve the reaction ratio of the carbon material (a) and polymer (b) in the contacting, the contacting is preferably performed while mixing and heating the mass in a pulverizer such as a sand mill, a roll mill, an attriter, a ball mill, and a kneader. Upon contacting, polymers other than the polymer (b) or monomers may be present.

In the production method of the present invention, it is preferred to perform heating in addition to the contacting of the carbon material (a) and the polymer (b), for eliminating the protective group $R^1R^2R^3C—$ from the alkoxycarbonyl group represented by the formula (1) in the polymer (b) to give carboxyl group.

In the production method of the present invention, the order of the steps of contacting and heating is arbitrary. That is, any method such as contacting the carbon material (a) with the polymer (b) followed by heating, contacting and heating the carbon material (a) and the polymer (b) simultaneously, and contacting the carbon material (a) and the polymer (b) in a pre-heated mixing system, may be performed. Preferable examples of the method may include:

(i) a method wherein the step of contacting the carbon material (a) with the polymer (b) is performed simultaneously with the step of heating for eliminating $R^1R^2R^3C—$ to give carboxyl group;

(ii) a method wherein the step of contacting the carbon material (a) with the polymer (b) is performed at a suitable temperature, and then the step of heating for eliminating $R^1R^2R^3C—$ to give carboxyl group is performed in the same batch; and (iii) a method wherein the step of contacting the carbon material (a) with the polymer (b) is performed at a suitable temperature, and after the reaction product obtained is dispersed in an organic solvent, the step of heating for eliminating $R^1R^2R^3C—$ to give carboxyl group is performed in the presence of acid or alkaline catalyst.

In the method (i), if there exists any acid catalyst such as compounds including sulfonic acid, hydrochloric acid or boron fluoride, the reaction proceeds rapidly. However, since carbon material (a) usually has acidity, the acid catalyst is not always necessary. Preferable contacting temperature i.e. preferable heating temperature in the method (i) is 50° to 200° C., particularly 70° to 180° C. Preferable heating time is 1 minute to 24 hours, particularly 3 minutes to 5 hours.

In the method (ii), the suitable contacting temperature is preferably 30° to 110° C., and the temperature for the subsequent step of heating for eliminating $R^1R^2R^3C—$ to give carboxyl group is preferably 110° to 200° C.

In the method (iii), the suitable contacting temperature is preferably 30° to 200° C., and the temperature for the subsequent heating step for eliminating $R^1R^2R^3C—$ to give carboxyl group is preferably 70° to 200° C. The organic solvent may include isopropyl alcohol, methyl ethyl ketone, hexane, butyl cellosolve, diethylene glycol dimethyl ether, and triethylene glycol dimethyl ether. The acid catalyst may include sulfuric acid, hydrochloric acid, acetic acid, and p-toluenesulfonic acid, and the alkaline catalyst may include sodium hydroxide, potassium hydroxide, triethylamine, and aqueous ammonia. The contacting time in the method (iii) is usually 5 minutes to 10 hours and preferably 10 minutes to 5 hours. The heating time for eliminating $R^1R^2R^3C—$ to give carboxyl group is usually 30 minutes to 5 hours.

The content of carboxyl group in the carbonaceous material obtained by the production method of the present invention including the heating step for eliminating $R^1R^2R^3C—$ to give carboxyl group is preferably 10 to 500 mmol, and more preferably 20 to 300 mmol per 100 g of the obtained carbonaceous material. If the content of carboxyl group is less than 10 mmol per 100 g of the carbonaceous material, the electrical resistance of the obtained carbonaceous material becomes lower, and dispersion of the carbonaceous material into water upon utilizing it for an aqueous ink becomes difficult, thus not being preferable. If the content of carboxyl group is more than 500 mmol per 100 g of the carbonaceous material, moisture resistance of the carbonaceous material becomes lower, thus not being preferable.

In the production method of the present invention, if hydroxyl group is included as the requisite reactive group in the polymer (b), the content of hydroxyl group in the carbonaceous material obtained is preferably 10 to 500 mmol, and more preferably 20 to 300 mmol per 100 g of the obtained carbonaceous material. If the content of hydroxyl group is less than 10 mmol per 100 g of the carbonaceous material, the electrical resistance of the obtained carbonaceous material becomes lower, and the product obtained by heat-curing the carbonaceous material with curing agent can not have sufficiently high strength, thus not being preferable. If the content of hydroxyl group is more than 500 mmol per 100 g of the carbonaceous material, moisture resistance of the carbonaceous material becomes lower, thus not being preferable.

The carbonaceous material obtained by the production method of the present invention shows low conductivity.

Preferably, the volume resistivity thereof is not less than $1\times10^8 \Omega\cdot cm$, and more preferably $1\times10^{12}$ to $1\times10^{30} \Omega\cdot cm$.

The carbonaceous material obtained by the production method of the present invention may be utilized for ink, toner, a sealing material, an end sealing material, or a color filter.

The carbonaceous material obtained by the production method of the present invention may also be utilized together with a carbonaceous material obtained by processing a carbonaceous material having a hydroxyl group with an acid anhydride.

With the production method of the present invention, the step of contacting of the carbon material (a) with the polymer (b) having a specific reactive group and a specific alkoxycarbonyl group in the molecule thereof, and the step of particular heating, as required, are performed. Thus the carbonaceous material obtained shows extremely low conductivity, and is useful as a material which needs to have electrical insulating property, or a raw material for an aqueous ink having low conductivity.

EXAMPLES OF THE INVENTION

The present invention is explained with reference to Examples and Comparative Examples. These Examples, however, are given only for illustration and are not intended for limiting the invention.

Example 1

1500 g of isopropyl alcohol was charged into a reactor of 5 liter capacity fitted with a stirrer, a condenser and a thermometer, heated to 65° C., and stirred. Subsequently, a mixture consisting of 684 g of isobutyl acrylate, 107 g of butyl acrylate, 326 g of methyl methacrylate, 210 g of hydroxyethyl acrylate, 154 g of t-butyl acrylate, 19 g of glycidyl methacrylate and 10 g of azoisobutyronitrile as a polymerization initiator, was continuously added dropwise into the reactor over 4 hours, and then the reaction was continued for 2 hours. The temperature was then elevated to 80° C. and the reaction was continued for one hour to obtain a solution containing a polymer having a number average molecular weight of 12,000. It was confirmed by potentiometric titration method that the polymer included epoxy group, hydroxyl group and t-butyloxycarbonyl group.

800 g of the aforementioned solution of the polymer (containing 400 g of the polymer) and 200 g of carbon black (manufactured by Degussa AG under the trade name of "Special Black 4", average particle size: 25 nm; the pH value of an aqueous suspension of the carbon black measured by the method of ISO-787-9 with a glass electrode is 2.5) as the carbon material (a) were charged into a stainless beaker, and isopropyl alcohol was added to the mass to adjust the solid content to be 35 wt %. The resulting mixture was kneaded for 30 minutes. And then glass beads were added to the mixture and stirred at 3000 rpm for 2 hours. Excess isopropyl alcohol was evaporated under reduced pressure, and the obtained paste was kneaded by a kneader at 60 rpm and at the temperature of 110° C. for 20 minutes for completing removal of the solvents and contacting reaction of the polymer and the carbon material (a), thereby obtaining a carbonaceous material. Analysis of the obtained carbonaceous material was performed by potentiometric titration method, to confirm that the content of carboxyl group was not more than 5 mmol per 100 g of the solid, whereas the content of epoxy group was 0 mmol per 100 g of the solid, and therefore the complete absence of epoxy group was confirmed.

The temperature of the obtained carbonaceous material was then elevated to 150° C., and the carbonaceous material was further kneaded for 30 minutes to remove t-butyl group from t-butyloxycarbonyl group in the polymer, to thereby obtain an acid group-containing carbon black (GC-1) in which carboxyl group was introduced in the polymer portion. GC-1 was analyzed by potentiometric titration method to find out that the content of carboxyl group was 40 mmol per 100 g of the solid, and the content of hydroxyl group was 50 mmol per 100 g of the solid.

GC-1, which had a number average molecular weight of 100,000, was mixed with polyacrylate having 50 mmol of acid per 100 g of resin and neutralized to give an aqueous ink. This aqueous ink was applied in printing, and dried at 100° C. to form a coating layer having a thickness of 5 μm. The volume resistivity of the obtained coating layer was measured and found out to be $1\times10^{15} \Omega\cdot cm$, i.e. the coating layer had an excellent insulating ability. Alternatively, GC-1 was added to commercially available polymethyl methacrylate so that the mixture contains 50 wt % of GC-1, thereby forming a film. The volume resistivity of the film was measured and found out to be $1\times10^{15} \Omega\cdot cm$, i.e. the film had an excellent insulating ability.

Example 2

1500 g of isopropyl alcohol was charged into a reactor of 5 liter capacity fitted with a stirrer, a condenser and a thermometer, heated to 65° C., and stirred. Subsequently, a mixture consisting of 684 g of isobutyl acrylate, 107 g of butyl acrylate, 326 g of methyl methacrylate, 210 g of hydroxyethyl acrylate, 154 g of 1-phenylethyl acrylate, 19 g of glycidyl methacrylate and 10 g of azoisobutyronitrile as a polymerization initiator, was continuously added dropwise into the reactor over 4 hours, and then the reaction was continued for 2 hours. The temperature was then elevated to 80° C. and the reaction was continued for one hour to obtain a solution containing a polymer having a number average molecular weight of 12,000. It was confirmed that the polymer included epoxy group, hydroxyl group and a 1-phenylethyloxycarbonyl group, in the same manner as in Example 1.

1000 g of the aforementioned solution of the polymer (containing 500 g of the polymer) and 200 g of carbon black as used in Example 1 as the carbon material (a) were charged into a stainless beaker, and isopropyl alcohol was added to the mass to adjust the solid content to be 35 wt %. The resulting mixture was kneaded for 30 minutes. And then glass beads were added to the mixture and stirred at 3000 rpm for 2 hours. Excess isopropyl alcohol was evaporated under reduced pressure, and the obtained paste was kneaded by a kneader at 60 rpm and at the temperature of 110° C. for 20 minutes, for completing removal of the solvents and contacting reaction of the polymer and the carbon material (a), thereby obtaining a carbonaceous material. Analysis of the obtained carbonaceous material was performed by potentiometric titration method, to confirm that the content of carboxyl group was not more than 5 mmol per 100 g of the solid, whereas the content of epoxy group was 0 mmol per 100 g of the solid, and therefore the complete absence of epoxy group was confirmed.

The temperature of the obtained carbonaceous material was then elevated to 150° C., and the carbonaceous material was further kneaded for 30 minutes for removing a 1-phenylethyl group from the 1-phenylethyloxycarbonyl group in the polymer, to thereby obtain an acid group-containing carbon black (GC-2) in which carboxyl group was introduced in the polymer portion. GC-2 was analyzed by potentiometric titration method to find out that the content of carboxyl group was 40 mmol per 100 g of the solid, and the content of hydroxyl group was 50 mmol per 100 of the solid.

An aqueous ink could be prepared by the same method as in Example 1. This aqueous ink was applied in printing, and dried at 100° C. to form a coating layer having a thickness of 5 $\mu$m. The volume resistivity of the obtained coating layer was measured and found out to be $1 \times 10^{15} \Omega \cdot cm$, i.e. the coating layer had an excellent insulating ability. Alternatively, GC-2 was added to commercially available polymethyl methacrylate so that the mixture contains 50 wt % of GC-2, thereby forming a film. The volume resistivity of the film was measured and found out to be $1 \times 10^{15} \Omega \cdot cm$, i.e. the film had an excellent insulating ability.

Example 3

1500 g of diethylene glycol dimethyl ether was charged into a reactor of 5 liter capacity fitted with a stirrer, a condenser and a thermometer, heated to 80° C. and stirred. Subsequently, a mixture consisting of 20 g of isopropenyl oxazoline, 140 g of t-butyl acrylate, 275 g of isobutyl methacrylate, 130 g of butyl acrylate, 235 g of methylmethacrylate, 210 g of hydroxyethylacrylate, 30 g of styrene, 460 g of nonylphenoxypolyethylene glycol acrylate and 10 g of azoisobutyronitrile as a polymerization initiator, was continuously added dropwise into the reactor over 4 hours, and then the reaction was continued for 2 hours. The reaction was further continued for one hour at 80° C. to obtain a solution containing a polymer having a number average molecular weight of 13,000. It was confirmed that the polymer included an oxazoline group, hydroxyl group and t-butyloxycarbonyl group, in the same manner as in Example 1.

600 g of the aforementioned solution of the polymer (containing 300 g of the polymer) and 300 g of carbon black as used in Example 1 as the carbon material (a) were charged into a stainless beaker, and diethylene glycol dimethyl ether was added to the mass to adjust the solid content to be 35 wt %. The mixture was kneaded for 30 minutes. And then glass beads were added to the mixture and stirred at 3000 rpm for 2 hours. Excess diethylene glycol dimethyl ether was evaporated under reduced pressure, and the obtained paste was kneaded by a three-roll kneader at 10 rpm and at the temperature of 130° C. for 15 minutes, for completing removal of the solvents and contacting reaction of the polymer and the carbon material (a), thereby obtaining a carbonaceous material. Analysis of the obtained carbonaceous material was performed by potentiometric titration method, to confirm that the content of carboxyl group was not more than 5 mmol per 100 g of the solid, whereas the content of epoxy group was 0 mmol per 100 g of the solid, and therefore the complete absence of epoxy group was confirmed.

300 g of the carbonaceous material was dissolved in diethylene glycol dimethyl ether at 100° C. After removing insoluble contents by filtration, the filtrate was charged into a three-neck flask, heated and stirred at 150° C. for 4 hours, and then condensed in vacuo at 100° C. to obtain an acid group-containing carbon black (GC-3) in which carboxyl group was introduced in the polymer portion. GC-3 was analyzed by potentiometric titration method, to find out that the content of carboxyl group was 36 mmol per 100 g of the solid, and the content of hydroxyl group was 50 mmol per 100 of the solid.

An aqueous ink could be prepared from GC-3 by the same method as in Example 1. This aqueous ink was applied in printing, and dried at 100 to form a coating layer having a thickness of 5 $\mu$m. The volume resistivity of the obtained coating layer was measured and found out to be $1 \times 10^{15} \Omega \cdot cm$, i.e. the coating layer had an excellent insulating ability. Alternatively, a film was formed with GC-3 in the same manner as in Example 1. The volume resistivity of the film was measured and found out to be $1 \times 10^{15} \Omega \cdot cm$, i.e. the film had an excellent insulating ability.

Example 4

600 g of the polymer solution (containing 300 g of the polymer) obtained in Example 1 and 200 g of carbon in the fine particulate form as the carbon material (a) were charged into a stainless beaker, and kneaded for 30 minutes. And then glass beads were added to the mixture and stirred at 3000 rpm for 2 hours. Excess isopropyl alcohol was evaporated under reduced pressure, and the obtained paste was kneaded by a kneader at 60 rpm and at the temperature of 100° to 120° C. for 15 minutes, for completing removal of the solvents and contacting reaction of the polymer and the carbon material (a), thereby obtaining a carbonaceous material.

300 g of the carbonaceous material was dissolved in diethylene glycol dimethyl ether at 100° C. After removing insoluble contents by filtration, the filtrate was charged into a three-neck flask. While a nitrogen gas was blown into the flask, 50 ml of 3N HCl aqueous solution was added and the mixture was heated and stirred at 80° C. for one hour. The resulting mixture was condensed in vacuo at 60° C. to obtain an acid group-containing carbon (GC-4) in which carboxyl group was introduced in the polymer portion. GC-4 was analyzed by potentiometric titration method to find out that the content of carboxyl group was 43 mmol per 100 g of the solid, and the content of hydroxyl group was 50 mmol per 100 of the solid.

Aqueous ink could be prepared from GC-4 by the same method as in Example 1. This aqueous ink was applied in printing, and dried at 100° C. to form a coating layer having a thickness of 5 $\mu$m. The volume resistivity of the obtained coating layer was measured and found out to be $1 \times 10^{7} \Omega \cdot cm$, i.e. the coating layer had an excellent insulating ability. Alternatively, a film was formed with GC-4 in the same manner as in Example 1. The volume resistivity of the film was measured and found out to be $1 \times 10^{7} \Omega \cdot cm$, i.e. the film had an excellent insulating ability.

Comparative Example 1

1500 g of isopropyl alcohol was charged into a reactor of 5 liter capacity fitted with a stirrer, a condenser and a thermometer, heated to 65° C., and stirred. Subsequently, a mixture consisting of 838 g of isobutyl acrylate, 107 g of butyl acrylate, 326 g of methyl methacrylate, 210 g of hydroxyethyl acrylate, 19 g of glycidyl methacrylate and 10 g of azoisobutyronitrile as a polymerization initiator, was continuously added dropwise into the reactor over 4 hours, and then the reaction was continued for 2 hours. The temperature was then elevated to 80° C. and the reaction was continued for one hour to obtain a solution containing a polymer having a number average molecular weight of 12,000. It was confirmed by the same manner as in Example 1, that the polymer included epoxy group and hydroxyl group, and that the polymer did not include any alkoxycarbonyl group.

800 g of the aforementioned solution of the polymer (containing 400 g of the polymer) and 200 g of carbon black as used in Example 1 as the carbon material (a) were charged into a stainless beaker, and isopropyl alcohol was added to the mass to adjust the solid content to be 35 wt %. The resulting mixture was kneaded for 30 minutes. And then glass beads were added to the mixture and stirred at 3000 rpm for 2 hours. Excess isopropyl alcohol was evaporated under reduced pressure, and the obtained paste was kneaded by a kneader at 60 rpm and at the temperature of 110° C. for 20 minutes, for completing removal of the solvents and contacting reaction of the polymer and the carbon material (a), thereby obtaining a carbonaceous material GC-5. Analysis of GC-5 was performed by potentiometric titration method, to confirm that the content of carboxyl group was not more than 5 mmol per 100 g of the solid, the content of hydroxyl group was 50 mmol per 100 g of the solid, the content of epoxy group was 0 mmol per 100 g of the solid, and therefore the complete absence of epoxy group was confirmed. An attempt to prepare an aqueous ink with GC-5 by the same method as in Example 1 was made, but any product having good quality could not be obtained because of the poor water dispersibility of GC-5.

Comparative Example 2

1500 g of isopropyl alcohol was charged into a reactor of 5 liter capacity fitted with a stirrer, a condenser and a thermometer, heated to 65° C., and stirred. Subsequently, a mixture consisting of 684 g of isobutyl acrylate, 317 g of butyl acrylate, 326 g of methyl methacrylate, 154 g of t-butyl acrylate, 19 g of isobutyl methacrylate and 10 g of azoisobutyronitrile as a polymerization initiator, was continuously added dropwise into the reactor over 4 hours, and then the reaction was continued for 2 hours. The temperature was then elevated to 80° C. and the reaction was continued for one hour to obtain a solution containing a polymer having a number average molecular weight of 12,000. It was confirmed by potentiometric titration method that the polymer included t-butyloxycarbonyl group, and that the polymer did not include a specific reactive group which should be included in the polymer used in the method of the present invention.

800 g of the aforementioned solution of the polymer (containing 400 g of the polymer) and 200 g of carbon black as used in Example 1 as the carbon material (a) were charged into a stainless beaker, and isopropyl alcohol was added to the mass to adjust the solid content to be 35 wt %. The resulting mixture was kneaded for 30 minutes. And then glass beads were added to the mixture and stirred at 3000 rpm for 2 hours. Excess isopropyl alcohol was evaporated under reduced pressure, and the obtained paste was kneaded by a kneader at 60 rpm and at the temperature of 150° C. for 50 minutes, thereby obtaining a carbonaceous material. Analysis of the carbonaceous material was performed by potentiometric titration method, to confirm that the content of carboxyl group was 50 mmol per 100 g of the solid, whereas the content of hydroxyl group was 0 mmol per 100 g of the solid.

An aqueous ink could be prepared from the obtained carbonaceous material by the same method as in Example 1. This aqueous ink was applied in printing, and dried at 100° C. to form a coating layer having a thickness of 5 μm. The volume resistivity of the obtained coating layer was measured and found out to be $1 \times 10^4 \Omega \cdot cm$, which is completely insufficient as an electrical insulator. Alternatively, a film was formed in the same manner as in Example 1. The volume resistivity of the film was measured and found out to be $1 \times 10^4 \Omega \cdot cm$, which is completely insufficient as an electrical insulator.

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A method for producing a carbonaceous material comprising the step of contacting a carbon material (a) with a polymer (b) having one or more reactive groups(s) selected from the group consisting of aziridine group, oxazoline group, N-hydroxyalkylamido group, epoxy group, thioepoxy group, isocyanato group, hydroxyl group, amino group, vinyl group, acryl group and methacryl group, and an alkoxycarbonyl group represented by the formula (I)

$$R^1R^2R^3C\text{—}O\text{—}CO\text{—} \qquad (I)$$

wherein $R^1$, $R^2$ and $R^3$ are the same or different groups and denote an organic residue selected from an alkyl group having 1 to 6 carbon atom(s), a cycloalkyl group having 5 to 8 carbon atoms, an alkylcycloalkyl group having 6 to 16 carbon atoms or an aryl group having 6 to 16 carbon atoms, where $R^1$, $R^2$ and $R^3$ may be bonded cyclically with each other, wherein the content of said reactive group in said polymer (b) is 10 to 500 mmol per 100 g of said polymer (b), and content of said alkoxycarbonyl group is 1 to 500 mmol per 100 g of said polymer (b).

2. The method as claimed in claim 1 wherein said carbon material (a) is selected from the group consisting of carbon black, aniline black, phenylene black, titan black, graphite, carbon fiber, carbon whisker, and mixtures thereof.

3. The method as claimed in claim 2 wherein said carbon material (a) is carbon black having a pH value of not more than 7, measured by a method according to ISO-787-9.

4. The method as claimed in claim 1 wherein said reactive group of said polymer (b) includes at least hydroxyl group as a requisite group.

5. The method as claimed in claim 1 wherein said alkoxycarbonyl group represented by the formula (I) is selected from the group consisting of t-butyloxycarbonyl group, 1,1-dimethylpropyloxycarbonyl group, 1-methyl-1-ethylpropyloxycarbonyl group, 1,1-diethylpropyloxycarbonyl group, 1,1-dimethylbutyloxycarbonyl group, 1,1-diethylbutyloxycarbonyl group, 1,1-dipropylbutyloxycarbonyl group, 1-methyl-1-ethylbutyloxycarbonyl group, 1-methyl-1-propylbutyloxycarbonyl group, 1-ethyl-1-propylbutyloxycarbonyl group, 1-methyl-1-phenylethyloxycarbonyl group, 1-methyl-1-phenylpropyloxycarbonyl group, 1-ethyl-1-phenylpropyloxycarbonyl group, 1-methyl-1-phenylbutyloxycarbonyl group, 1-ethyl-1-phenylbutyloxycarbonyl group, 1-propyl-1-phenylbutyloxycarbonyl group, 1-methyl-1-(4-methyl) phenylethyloxycarbonyl group, 1-methyl-1-(4-methylphenyl) propyloxycarbonyl group, 1-ethyl-1-(4-methylphenyl) propyloxycarbonyl group, 1-methyl-1-(4-methylphenyl) butyloxycarbonyl group, 1-ethyl-1-(4-methylphenyl) butyloxycarbonyl group, 1-propyl-1-(4-methylphenyl) butyloxycarbonyl group, 1-methyl-1-cyclopentylethyloxycarbonyl group, 1-methyl-1-cyclopentylpropyloxycarbonyl group, 1-ethyl-1-cyclopentylpropyloxycarbonyl group, 1-methyl-1- cyclopentylbutyloxycarbonyl group, 1-ethyl-1-cyclopentylbutyloxycarbonyl group, 1-propyl-1-cyclopentbutyloxycarbonyl group, 1-methyl-1-cyclohexylethyloxycarbonyl group, 1-methyl-1-cyclohexylpropyloxycarbonyl group, 1-ethyl-1-cyclohexylpropyloxycarbonyl group, 1-methyl-1-cyclohexylbutyloxycarbonyl group, 1-ethyl-1-cyclohexylbutyloxycarbonyl group, 1-propyl-1-cyclohexylbutyloxycarbonyl group, 1-methyl-1-(4-methylcyclohexyl) ethyloxycarbonyl group, 1-methyl-1-(4-methylcyclohexyl) propyloxycarbonyl group, 1-ethyl-1-(4-methylcyclohexyl) propyloxycarbonyl group, 1-methyl-1-(4-methylcyclohexyl) butyloxycarbonyl group, 1-ethyl-1-(4-methylcyclohexyl) butyloxycarbonyl group, 1-propyl-1-(4-methylcyclohexyl) butyloxycarbonyl group, 1-methyl-1-(2,4-dimethylcyclohexyl)ethyloxycarbonyl group, 1-methyl-1-(2,4-dimethylcyclohexyl)propyloxycarbonyl group, 1-ethyl-1-(2,4-dimethylcyclohexyl) propyloxycarbonyl group, 1-methyl-1-(2,4-dimethylcyclohexyl)butyloxycarbonyl group, 1-ethyl-1-(2, 4-dimethylcyclohexyl)butyloxycarbonyl group, 1-propyl-1-(2,4-dimethylcyclohexyl)butyloxycarbonyl group, 1-methylcyclopentyloxycarbonyl group, 1-ethylcyclopentyloxycarbonyl group, 1-propylcyclopentyloxycarbonyl group, 1-butylcyclopentyloxycarbonyl group, 1-methylcyclohexyloxycarbonyl group, 1-ethylcyclohexyloxycarbonyl group, 1-propylcyclohexyloxycarbonyl group, 1-butylcyclohexyloxycarbonyl group, 1-pentylcyclohexyloxycarbonyl group, 1-methylcycloheptyloxycarbonyl group and 1-methylcyclooctyloxycarbonyl group.

6. The method as claimed in claim 1 wherein number average molecular weight of said polymer (b) employing poystyrene as a standard sample is 1000 to 100000.

7. The method as claimed in claim 1 wherein contacting temperature in the step of contacting said carbon material (a) with said polymer (b) is a temperature at which said polymer (b) covalently bonds to a surface of said carbon material (a).

8. The method as claimed in claim 7 wherein said temperature at which said polymer (b) covalently bonds to a surface of said carbon material (a) is 30° to 230° C.

9. The method as claimed in claim 1 wherein weight ratio of said carbon material (a) to said polymer (b) which are contacted is 1:0.5 to 1:10.

10. The method as claimed in claim 1 further including a step of heating for eliminating $R^1R^2R^3C$— from said alkoxycarbonyl group represented by the formula (I) in said polymer (b) to give a carboxyl group wherein the step of contacting said carbon material (a) with said polymer (b) and the step of heating for eliminating $R^1R^2R^3C$— from said alkoxycarbonyl group represented by the formula (I) in said polymer (b) to give said carboxyl group are performed simultaneously.

11. The method as claimed in claim 10 wherein a temperature in said contacting step and said heating step is 50° to 200° C.

12. The method as claimed in claim 1 further including a step of heating for eliminating $R^1R^2R^3C$— from said alkoxycarbonyl group represented by the formula (I) in said polymer (b) to give a carboxyl group wherein the step of contacting said carbon material (a) with said polymer (b) is performed, and then the step of heating for eliminating $R^1R^2R^3C$— from said alkoxycarbonyl group represented by the formula (I) in said polymer (b) to give a carboxyl group is performed in the same batch.

13. The method as claimed in claim 12 wherein a contacting temperature in said contacting step is 30° to 110° C., and a heating temperature in said heating step is 110° to 200° C.

14. The method as claimed in claim 1 further including a step of heating for eliminating $R^1R^2R^3C$— from said alkoxycarbonyl group represented by the formula (I) in said polymer (b) to give a carboxyl group wherein after the step of contacting said carbon material (a) with said polymer (b), a reaction product obtained is dispersed in an organic solvent, and then subjected to the step of heating in the presence of an acid or alkaline catalyst for eliminating $R^1R^2R^3C$— from said alkoxycarbonyl group represented by the formula (I) in said polymer (b) to give said carboxyl group.

15. The method as claimed in claim 14 wherein the contacting temperature in said contacting step is 30° to 200° C., and the heating temperature in said heating step is 70° to 200° C.

16. The method as claimed in claim 14 wherein the organic solvent is selected from the group consisting of isopropyl alcohol, methyl ethyl ketone, hexane, butyl cellosolve, diethylene glycol dimethyl ether, and triethylene glycol dimethyl ether and mixtures thereof.

17. The method as claimed in claim 14 wherein said acid catalyst is selected from the group consisting of sulfuric acid, hydrochloric acid, acetic acid, p-toluenesulfonic acid and mixtures thereof, or said alkaline catalyst is selected from the group consisting of sodium hydroxide, potassium hydroxide, triethylamine, aqueous ammonia and mixtures thereof.

18. The method as claimed in claim 1 wherein volume resistivity of said carbonaceous material obtained is not less than $1 \times 10^8 \Omega \cdot cm$.

19. The method as claimed in claim 4 wherein content of hydroxyl group in said carbonaceous material obtained is 10 to 500 mmol per 100 g of said carbonaceous material.

20. The method as claimed in claim 1 wherein content of carboxyl group in said carbonaceous material obtained is 10 to 500 mmol per 100 g of said carbonaceous material.

21. The method as claimed in claim 10 wherein content of said carboxyl group in said carbonaceous material obtained is 10 to 500 mmol per 100 g of said carbonaceous material.

22. The method as claimed in claim 12 wherein said content of said carboxyl group in said carbonaceous material obtained is 10 to 500 mmol per 100 g of said carbonaceous material.

23. The method as claimed in claim 14 wherein the content of the carboxyl group in said carbonaceous material obtained is 10 to 500 mmol per 100 g of said carbonaceous material.

* * * * *